Patented Apr. 20, 1926.

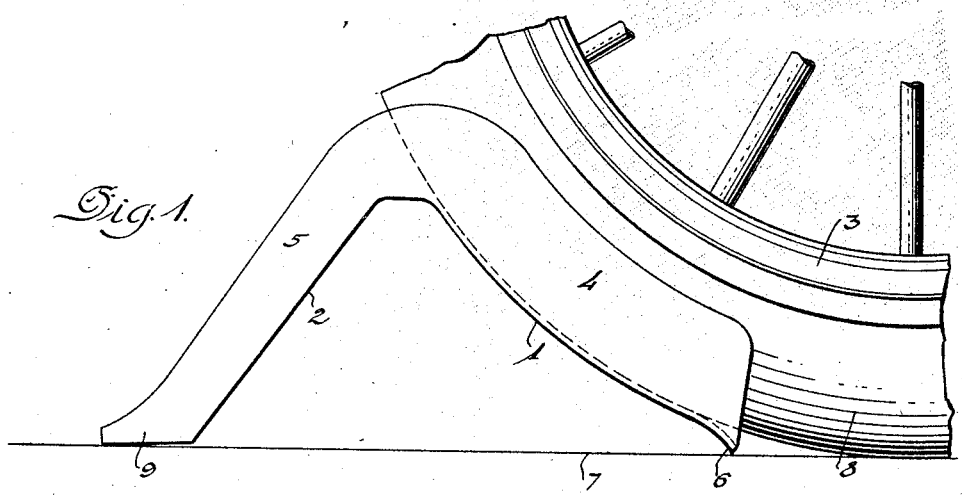
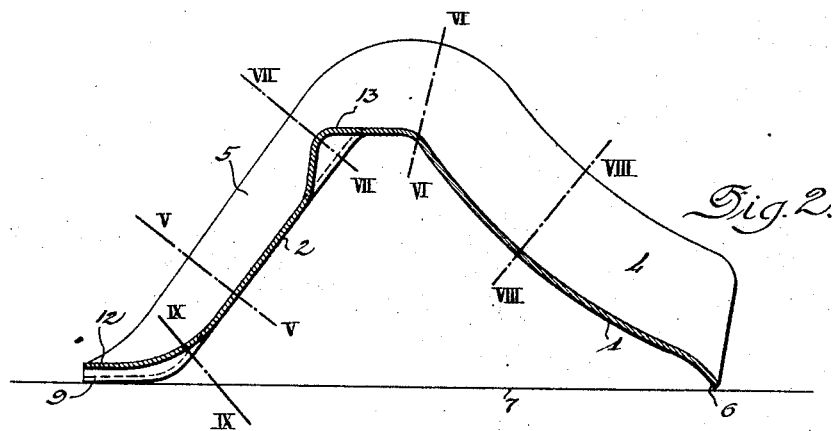
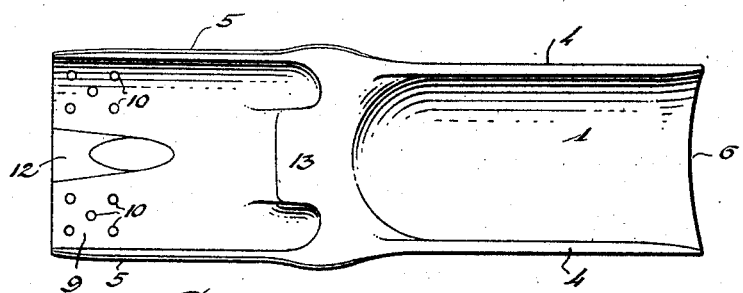

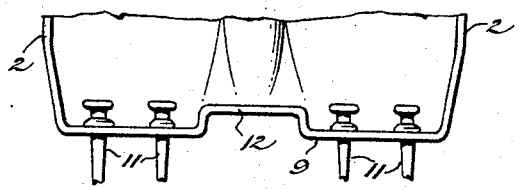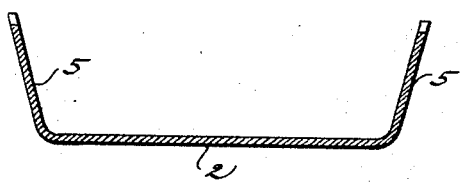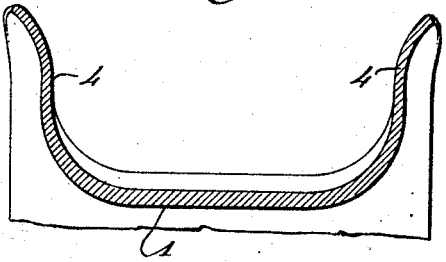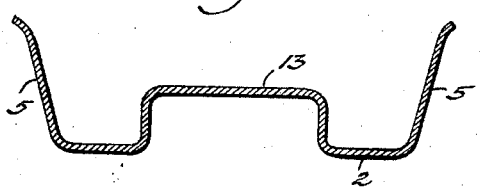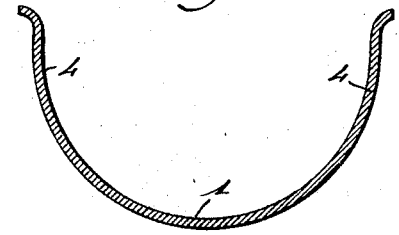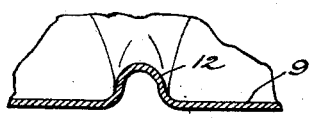

1,581,696

UNITED STATES PATENT OFFICE.

REUBEN B. STIPES, OF FLINT, MICHIGAN.

WHEEL CHOCK.

Application filed December 23, 1922. Serial No. 608,646.

*To all whom it may concern:*

Be it known that I, REUBEN B. STIPES, a citizen of the United States of America, residing at Flint, in the county of Genesee and State of Michigan, have invented certain new and useful Improvements in Wheel Chocks, of which the following is a specification, reference being had therein to the accompanying drawings.

My invention aims to provide a metallic chock or wheel holding device which, with or without other wheel holding means, may be advantageously used for preventing accidental movement of automobiles or other vehicles during transportation.

My invention further aims to provide a metallic chock that may be pressed, stamped or otherwise formed from a single piece of material, the chock being substantially inverted V-shaped in elevation and channel shaped in cross section with one part of the chock providing a wheel engaging label or member and the other part of the chock providing a bracing leg or member. With these legs or members made from channel stock bent to form, provision is made to preclude buckling or cracking of the piece of channel stock when bent, and I attach considerable importance to the provision by which the metal may naturally flow in a direction, not only to prevent buckling of the piece of stock, but to afford a reinforcement for the bracing leg or what might otherwise be a weak point in the chock. In bracing the chock from a single piece of material the bracing leg may have imparted thereto a foot conformation by which the chock may be fixed to a floor or other support, the foot accommodating anchoring means and the tool, such as a crow bar, by which the anchoring means may be easily extracted from a floor or support without materially injuring the same.

My invention will be hereinafter specifically described and then claimed, and reference will now be had to the drawings, wherein—

Figure 1 is a side elevation of the chock or wheel holding device in engagement with a portion of a wheel;

Fig. 2 is a vertical longitudinal sectional view of the chock;

Fig. 3 is a plan of the same;

Fig. 4 is an end view of the foot formation of the chock;

Fig. 5 is a cross sectional view taken on the line V—V of Fig. 2;

Fig. 6 is a cross sectional view taken on the line VI—VI of Fig. 2;

Fig. 7 is a cross sectional view taken on the line VII—VII of Fig. 2;

Fig. 8 is a cross sectional view taken on the line VIII—VIII of Fig. 2 and

Fig. 9 is a cross sectional view taken on the line IX—IX of Fig. 2.

As pointed out in the beginning the wheel chock is made from a single piece of metal pressed and shaped to form a substantially inverted V-shaped chock composed of a wheel engaging leg 1 and a bracing leg 2. The wheel engaging leg 1 is described on an arc having for its radius that of the wheel 3 which engages the leg and in forming the chock the legs thereof are provided with flanges 4 and 5 which are a continuation of each other and consequently extend over the apex of the chock. In shaping the wheel engaging leg 1 the floor engaging end thereof terminates in a lip or sharp edge 6 which may engage on or in a floor 7 to the extent of preventing this end of the chock from slipping, also to prevent the chock from injuring a tire 8 on the wheel 3. In addition to forming this lip the leg 1, has a cross sectional area imparted thereto corresponding to the cross section of the tire 8, as best shown in Fig. 8, so that the wheel engaging leg 1 will snugly engage the tire 8 and prevent the tire from being squeezed or in all probability injured at any particular point.

In forming the leg 2 the flanges 5 are disposed at an angle to the body of the leg, as best shown in Fig. 5 and with these flanges integral with the flanges 4 the chock is longitudinally reinforced throughout its length, particularly at the apex or juncture of the legs 1 and 2.

The floor engaging end of the bracing leg 2 terminates in a foot 9 provided with a plurality of openings 10 so that spikes, nails, or the like may be employed for anchoring or securing the foot to the floor 7. As shown in Fig. 4 the spikes or nails 11 may be of the double head type which will permit of a crow bar, hammer claw or other tool being placed under the spikes to withdraw the same from the floor 7, without splintering or injuring the floor. However, I make other provision for extracting the spikes or nails used by providing the foot 9 with a longitudinal raised portion 12 merging into the leg 2 and it is under this raised portion that a crow bar or other tool may be placed for prying or raising the foot from the floor 7.

In practice, I may use channel material for making the chock in which instance the material would be buckled, cracked or distorted to that extent, at the apex of the chock, as to weaken the chocking device, if I did not otherwise take care of the conformation of the metal at this particular point. I do this by allowing the metal to naturally flow or expand into an offset portion 13 in the direction of the bracing leg 2, such offset metal reinforcing the bracing leg at the very point where its cross sectional area may be weakened and require additional strength or rigidity. Since the metal is allowed to naturally expand there is no danger of the juncture of the legs 1 and 2 being disrupted and consequently a smooth finish is obtained for the upper end of the wheel engaging leg 1, such being essential on account of the tire 8.

When transporting an automobile or other vehicle in a freight car it is preferable to use a chock at each wheel and when the automobile reaches its designation and the chocks are removed, said chocks may be nested, tied or otherwise held together and returned to the shipper. The configuration of the chocks is conducive to more or less nesting and it is by virtue of the chocks being returned that they may be repeatedly used in the shipment of automobiles.

On account of each chock being made from a single piece of material a method enters into the construction of the same and I attach considerable importance to the fact that impressing or bending the material provision is made, by the offset portion 13, to prevent the inherent strength of the metal from being impaired during the pressing or bending operation.

One embodiment of my invention has been illustrated, but it is to be understood that the configuration of the chock is susceptible to change without departing from the scope of the appended claims.

What I claim is:—

1. As a new article of manufacture, a wheel chock pressed from a single piece of channel material bent to a substantial inverted V-shape with the material expanded adjacent the apex of the chock to prevent buckling, cracking or distortion of the material during the formation of the chock.

2. As the new article of manufacture, a wheel chock pressed from a single piece of channel material bent to a substantial inverted V-shape to form a bracing leg and a wheel engaging leg and the material at the apex of the chock offset in the direction of the bracing leg to reinforce said leg and preclude weakness at the apex.

3. As a new article of manufacture, a wheel chock made of a single piece of channel material bent to form a wheel engaging leg and a bracing leg with the channel flanges of the wheel engaging leg continued on to the bracing leg and said bracing leg formed with a foot having a raised portion, said channel material being off-set towards said bracing leg to preclude weakness at the juncture of said legs.

In testimony whereof I affix my signature.

REUBEN B. STIPES.